UNITED STATES PATENT OFFICE.

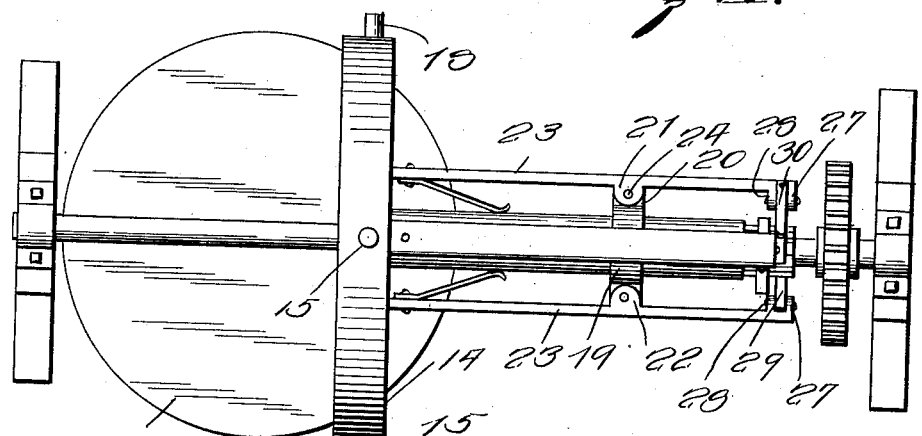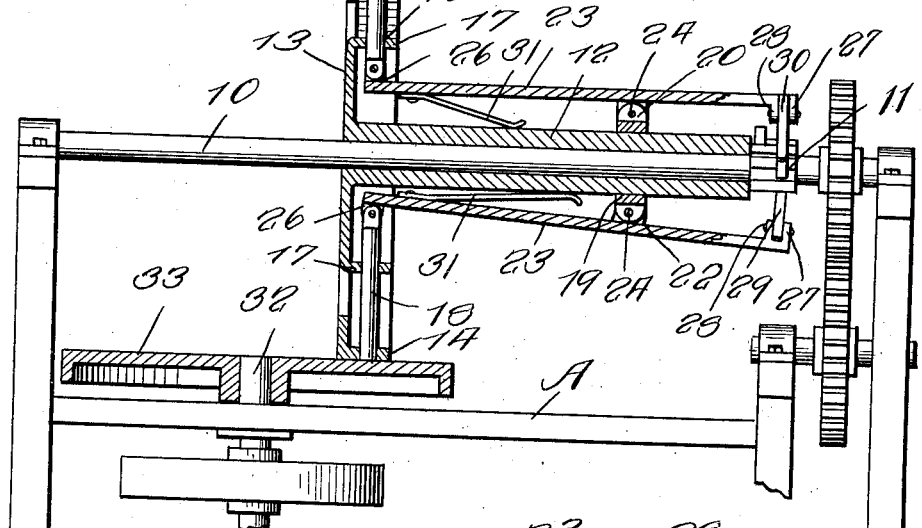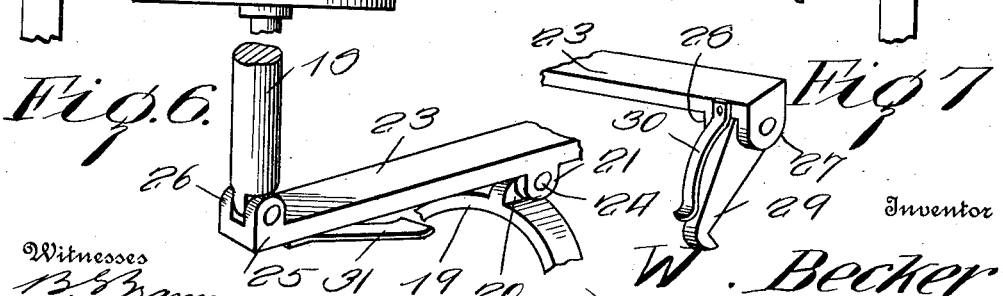

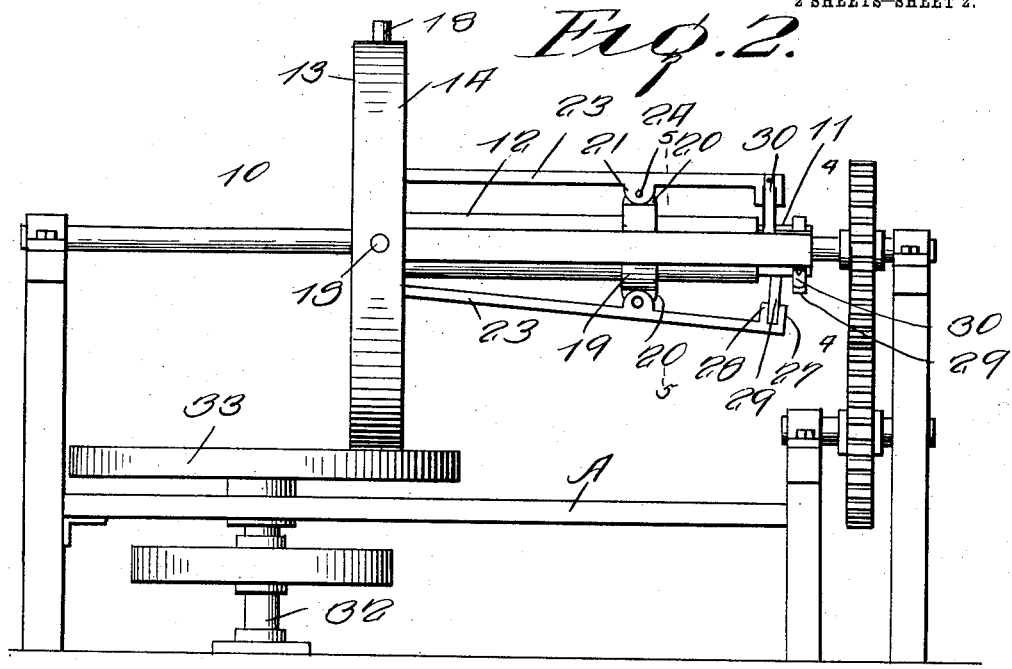
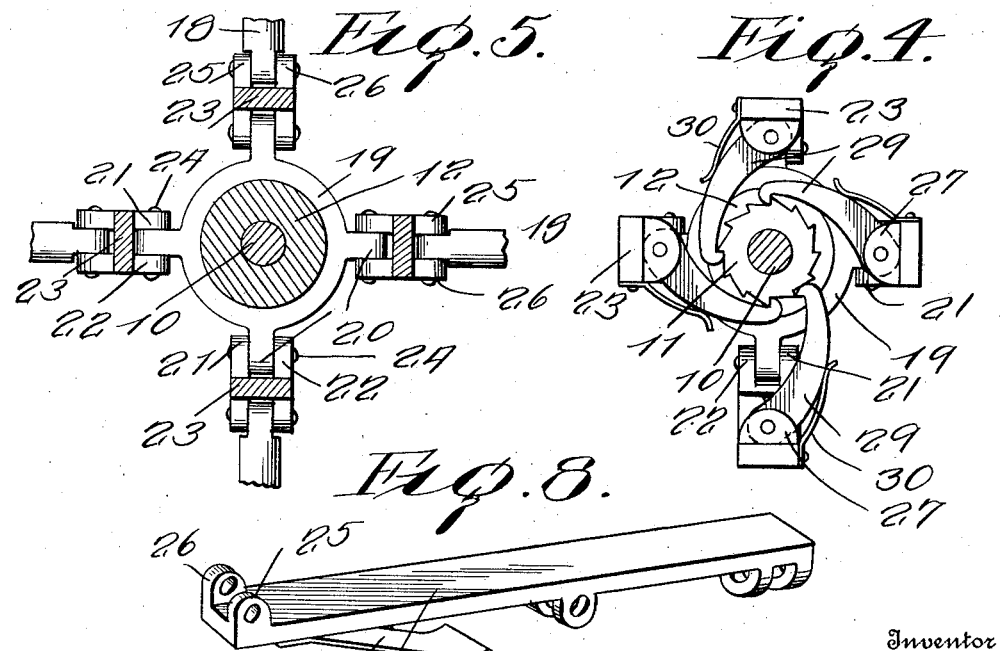

WILHELM BECKER, OF EMERY, SOUTH DAKOTA.

POWER-TRANSMISSION DEVICE.

1,058,531.     Specification of Letters Patent.     Patented Apr. 8, 1913.

Application filed August 19, 1912. Serial No. 715,888.

*To all whom it may concern:*

Be it known that I, WILHELM BECKER, a citizen of the United States, residing at Emery, in the county of Hanson, State of South Dakota, have invented certain new and useful Improvements in Power-Transmission Devices; and I do hereby declare the following to be a full, clear, and exact description of the invention, such as will enable others skilled in the art to which it appertains to make and use the same.

This invention relates to power transmission devices.

The object of the invention resides in the provision of a device which is adapted to accelerate rotation of a shaft through the medium of a plurality of successively operated levers, and which will be simple in construction, efficient in use and comparatively inexpensive to manufacture.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a plan view of a device constructed in accordance with the invention. Fig. 2 a side elevation of what is shown in Fig. 1. Fig. 3 a longitudinal section of Fig. 1. Fig. 4 a section on the line 4—4 of Fig. 2. Fig. 5 a section on the line 5—5 of Fig. 2. Fig. 6 a detail perspective view showing the connection between one of the levers and one of the presser arms of the device. Fig. 7 a detail perspective view showing the connections between one of the levers and the pawl carried thereby, and Fig. 8 a detail perspective view of one of the levers detached with its presser arm and pawl removed.

Referring to the drawings A indicates generally the frame of the device and journaled in this frame is a horizontal shaft 10. Fixed upon the shaft 10 at a desired point in the length of the latter is a ratchet wheel 11 for a purpose that will presently appear. Loosely mounted upon the shaft 10 and having one end thereof in engagement with the ratchet wheel 11 is a tubular shaft 12. Fixed on the end of the tubular shaft 12 remote from the ratchet wheel 11 is a friction disk 13 provided around its periphery with a flange 14 directed toward the ratchet wheel 11. Formed in this flange 14 at equidistant spaced points are openings 15 which radially aline respectively with openings 16 formed in inwardly directed tongues 17 struck from the friction disk 13. Slidably mounted in alined openings 15 and 16 are presser arms 18. Fixed on the tubular shaft 12 intermediate the ends of the latter is a collar 19 which has provided at equi-distantly spaced points on its periphery perforated ears 20, the number of said ears corresponding to the number of presser arms 18. Each of the ears 19 is received between spaced ears 21 and 22 formed on a lever 23, said lever being pivotally connected to the collar 19 by means of a pin 24 passing through the ears 21, 20 and 22. The inner end of each lever 23 is provided with spaced ears 25 and 26 between which is pivotally connected the inner end of a presser arm 18. The end of each lever 23 remote from the presser arm 18 is provided with transversely disposed spaced ears 27 and 28 between which is pivotally mounted a pawl 29 in position to operatively engage the teeth of the ratchet wheel 11 when the end of the lever carrying said pawl adjacent the presser arm 18 is moved inwardly toward the tubular shaft 12. Each of the pawls 29 is forced into operative engagement with the ratchet wheel 11 by means of a leaf spring 30, while the end of the lever remote from said pawl is normally held elevated or away from the tubular shaft 12 by means of a leaf spring 31 carried by said lever and having its free end in engagement with the tubular shaft 12. It will be noted that in the normal position of the various levers 23 the outer ends of the presser arms 18 are disposed outwardly of or beyond the outer face of the flange 14 and it will be further noted that should any of these presser arms be forced inwardly with respect to the friction disk 13, the end of the lever 23 adjacent the friction disk 13 will be moved toward the tubular shaft 12 against the influence of the spring 31. This movement of the lever 23 will cause the pawl 29 carried thereby to engage a tooth of the ratchet wheel 11 and partially rotate said ratchet wheel with great power and of course in turn effect the rotation of the shaft 10.

Journaled in the frame A is a vertical shaft 32 which is adapted to be rotated through the medium of any suitable source of power. Fixed on this shaft 32 is a friction disk 33 which operatively engages the flange 14 of the friction disk 13. By this construction it will be apparent that as the friction disk 33 is rotated a corresponding rotation will be imparted to the friction disk 13 and during this rotation of the disks 33 and 13 the outer ends of the presser arms 18 will be successively engaged by the friction disk 33 and forced inwardly of the friction disk 13 so as to successively move the ends of the levers 23 adjacent the disk 13 toward the tubular shaft 12 and thereby accelerate the rotation of the shaft 10.

What I claim is:—

In a device of the class described, the combination of a frame, a shaft journaled in said frame, a tubular shaft rotatably mounted on said first named shaft, a disk fixed on said tubular shaft, a plurality of presser arms slidably mounted on said disk and having their outer ends normally disposed beyond the periphery of the disk, a plurality of levers corresponding in number to the presser arms and pivotally mounted upon said tubular shaft and disposed longitudinally of the latter, said levers being pivotally connected with the inner ends of said presser arms respectively whereby the movement of the latter inwardly of the disk will force the end of the lever with which it is connected toward the tubular shaft, means whereby the movement of said levers under the influence of the movement of the presser arms inwardly of the disk will effect a rotation of said first named shaft, and means for successively moving said presser arms inwardly of the disk during the rotation of the latter.

In testimony whereof, I affix my signature, in presence of two witnesses.

WILHELM BECKER.

Witnesses:
LOUIS JANS,
CHARLES KEARNEY.

Copies of this patent may be obtained for five cents each, by addressing the "Commissioner of Patents, Washington, D. C."